J. C. BENTHALL.
Seed-Planter.
No. 23,071.
Patented Mar. 1, 1859.
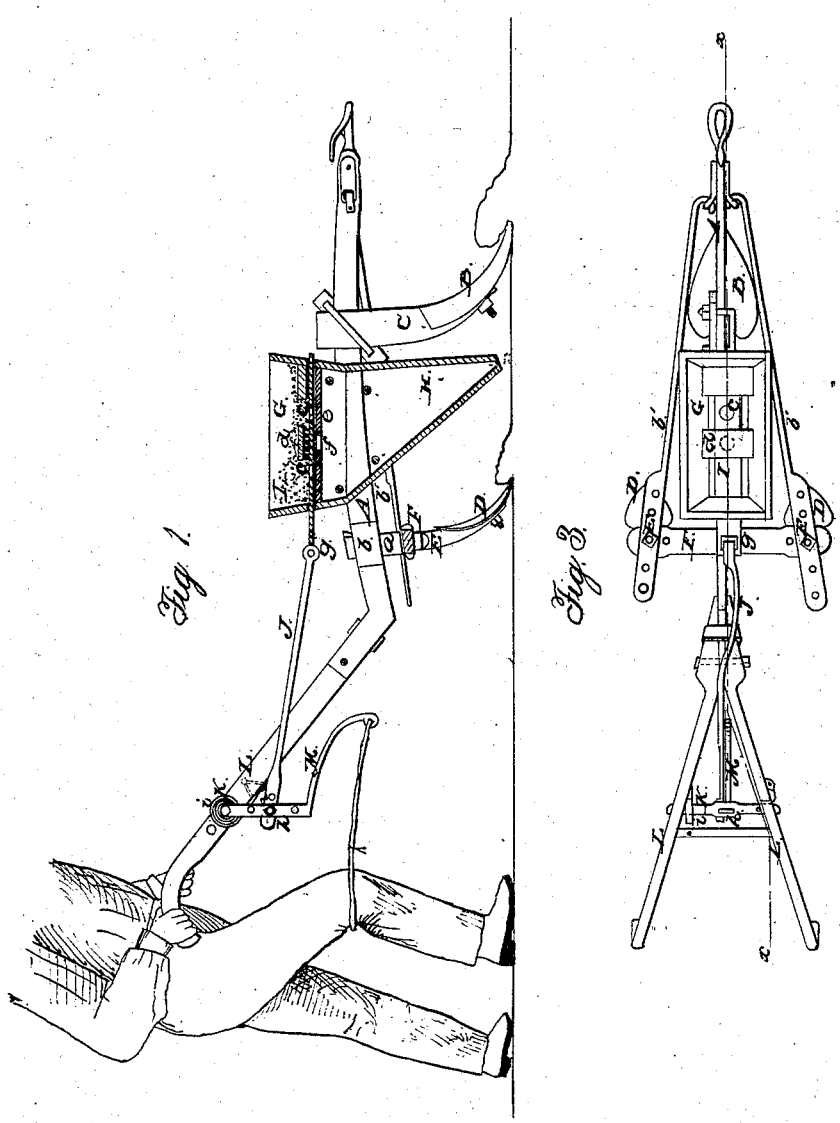

UNITED STATES PATENT OFFICE.

J. C. BENTHALL, OF OAKLAND, TEXAS.

IMPROVEMENT IN SEED-PLANTERS.

Specification forming part of Letters Patent No. 23,071, dated March 1, 1859.

*To all whom it may concern:*

Be it known that I, J. C. BENTHALL, of Oakland, in the county of Lavaca and State of Texas, have invented a new and useful Improvement in Seeding-Machines; and I do hereby declare that the following is a full, clear, and exact description of the same, reference being had to the annexed drawings, making a part of this specification, in which—

Figure 1 is a side sectional view of a seeding-machine constructed according to my invention, $x\ x$, Fig. 2, indicating the plan of section. Fig. 2 is a plan or top view of same.

Similar letters of reference indicate corresponding parts in the several figures.

This invention consists in a novel way of arranging the driving or operating parts of the seed-distributing device, as hereinafter fully shown and described, whereby the seed-distributing device may be attached to the leg of the attendant and operated by the natural movement of the attendant while walking along behind the machine.

To enable those skilled in the art to fully understand and construc my invention, I will proceed to describe it.

A represents the beam of the machine, which may be constructed of either metal or wood.

B is a furrow-share, which is attached to a standard, C, secured to the beam A, near its front end, and D D are covering-shares, which are attached to standards E E, the upper ends of which pass through a bar, F, one near each end. The bar F is secured at its center to the lower end of a standard, $a$, which is secured in a socket, $b$, on the beam A. The ends of the bar F are attached to one end of rods $b'\ b'$, the opposite ends of which are secured to the front part of the beam A. (See Fig. 2.)

On the beam A a seed-box, G, is placed. This seed-box has a spout, H, attached to its lower end, said spout extending down just behind the furrow-share B, as shown clearly in Fig. 1.

I is a slide, which passes longitudinally through the box G, at its bottom. The slide I has two holes, $c\ c$, made through it at a suitable distances apart, and at the center of the box, directly over the slide I, a cut-off brush, $d$, is placed. The bottom $e$ of the hopper has a hole, $f$, made in it, said hole being directly underneath the cut-off brush $d$. (See Fig. 1.)

The back end of the slide I has a rod, J, attached to it by a joint, $g$, and the outer end of the rod J is attached to a pendant, $h$, which is secured to a rock-shaft, K, which is placed between the handles L L, said handles being of the usual form and attached to the back end of the beam A. The rock-shaft K has a spring, $i$, attached to it. This spring may be attached at one end to one of the handles L, and coiled around one end of the rock-shaft and attached to the same, the spring having a tendency to keep the slide I thrown forward at the end of its forward movement.

To the pendant $h$ a pendent rod, M, is attached, said rod extending down a suitable distance and connected, when the machine is in operation, by a strap to the attendant's knee, as shown in red, Fig. 1.

The operation is as follows: The box G is supplied with corn or other seed to be planted, and the machine is drawn along in the usual manner, the lower end of the rod M being attached to the attendant's knee or leg. The attendant grasps the handles L L, as usual, and the natural movement of the leg of the attendant in walking, in connection with the spring $i$, will communicate a reciprocating motion to the slide I, the leg that is attached to the pendant M drawing back the slide I as said leg straightens, and the other one, with the machine, moves forward, and the spring $i$, throwing the slide forward as said leg (the one to which the slide is attached) advances. The seed is distributed in precisely the same way as in the generality of cases where reciprocating seed-slides are used, the holes $c\ c$ filling with seed when within the box, and discharging their contents when brought by the movement of the slide underneath the cut-off brush $d$ and in register with the hole $f$ in the bottom $e$.

By this invention the seed-slide I is operated with certainty, and without any trouble or attention on the part of the attendant.

I do not claim as new any part pertaining to the seed dropping or distributing mechanism, for that is an old and well-known device. Nor do I claim as novel anything pertaining to furrow and covering shares; but,

Having thus described my invention, what I claim as new, and desire to secure by Letters Patent, is—

The arrangement of the rock-shaft K, connecting-rod J, arm h, spring i, and pendant M, substantially as shown and described, for the purpose of enabling the seed-distributing device to be actuated by the leg of the operator.

J. C. BENTHALL.

Witnesses:
  I. C. WILSON,
  J. B. HAWKINS.